(12) United States Patent
Ellä et al.

(10) Patent No.: US 6,990,357 B2
(45) Date of Patent: Jan. 24, 2006

(54) FRONT-END ARRANGEMENTS FOR MULTIBAND MULTIMODE COMMUNICATION ENGINES

(75) Inventors: Juha Ellä, Halikko (FI); Nigel Martin, Salo (FI); Janne Kyläkoski, Paimio (FI)

(73) Assignee: Nokia Corporation, Espoo (FI)

( * ) Notice: Subject to any disclaimer, the term of this patent is extended or adjusted under 35 U.S.C. 154(b) by 271 days.

(21) Appl. No.: 10/688,275

(22) Filed: Oct. 17, 2003

(65) Prior Publication Data
US 2005/0085260 A1    Apr. 21, 2005

(51) Int. Cl.
*H04M 1/00* (2006.01)
(52) U.S. Cl. .................. 455/553.1; 455/552.1
(58) Field of Classification Search .................. 455/78, 455/552.1, 553.1, 269, 272, 129, 168.1
See application file for complete search history.

(56) References Cited

U.S. PATENT DOCUMENTS

| | | | |
|---|---|---|---|
| 6,381,471 B1 * | 4/2002 | Dvorkin ................. | 455/552.1 |
| 6,751,470 B1 * | 6/2004 | Ella et al. .............. | 455/188.1 |
| 2003/0114188 A1 * | 6/2003 | Rousu ..................... | 455/553 |
| 2003/0119547 A1 * | 6/2003 | Leyh et al. ............... | 455/552 |
| 2004/0092285 A1 * | 5/2004 | Kodim .................... | 455/552.1 |
| 2004/0135729 A1 * | 7/2004 | Talvitie et al. ........... | 343/702 |
| 2004/0162107 A1 * | 8/2004 | Klemetti et al. ......... | 455/553.1 |
| 2004/0204035 A1 * | 10/2004 | Raghuram et al. ....... | 455/553.1 |
| 2005/0032548 A1 * | 2/2005 | Frank ..................... | 455/552.1 |
| 2005/0085201 A1 * | 4/2005 | Martin et al. ............ | 455/168.1 |
| 2005/0085202 A1 * | 4/2005 | Ella et al. ................ | 455/168.1 |

* cited by examiner

*Primary Examiner*—Nick Corsaro
*Assistant Examiner*—Raymond B. Persino
(74) *Attorney, Agent, or Firm*—Ware, Fressola, Van Der Sluys & Adolphson LLP

(57) ABSTRACT

A receive front-end module in a multi-band communication device. The communication device comprises a plurality of signal paths for receiving and transmitting communication signals in a plurality of frequency bands in GSM and W-CDMA modes. The signal paths in the receive front-end module are operatively connected to a common feed point, which is connected to one of the RF antennas of the communication device, and the signal paths are selected such that none of the frequency bands for receiving communication signals in the receive front-end module are overlapping. If the communication device also transmits the communication signal in at least one transmit frequency range partially overlapping with one of the frequency bands in the receive front-end module, switching means is provided to at least one of signal paths in the receive front-end module for providing cross-band isolation between the transmitted and received communication signals.

32 Claims, 10 Drawing Sheets

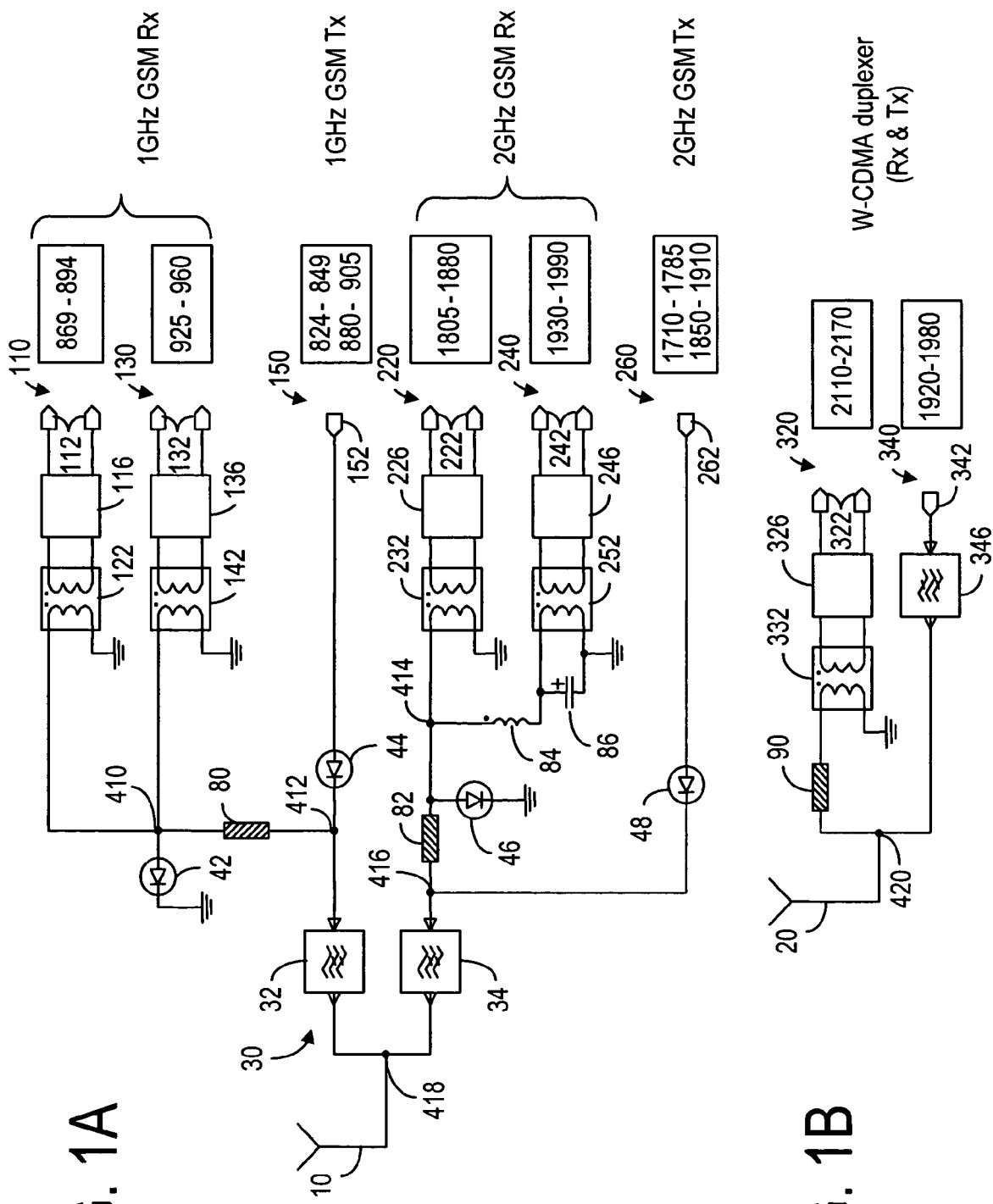

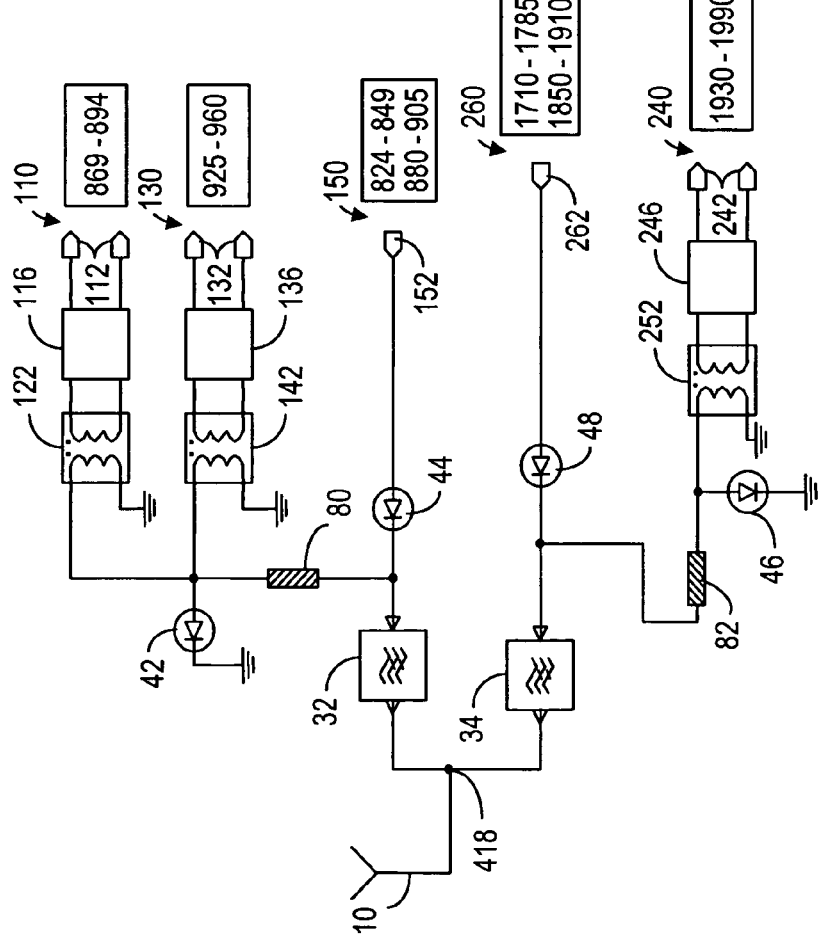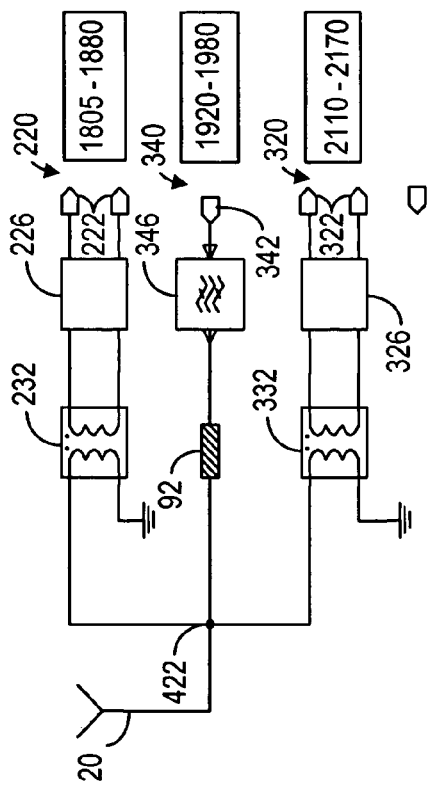
FIG. 2B
FIG. 2A

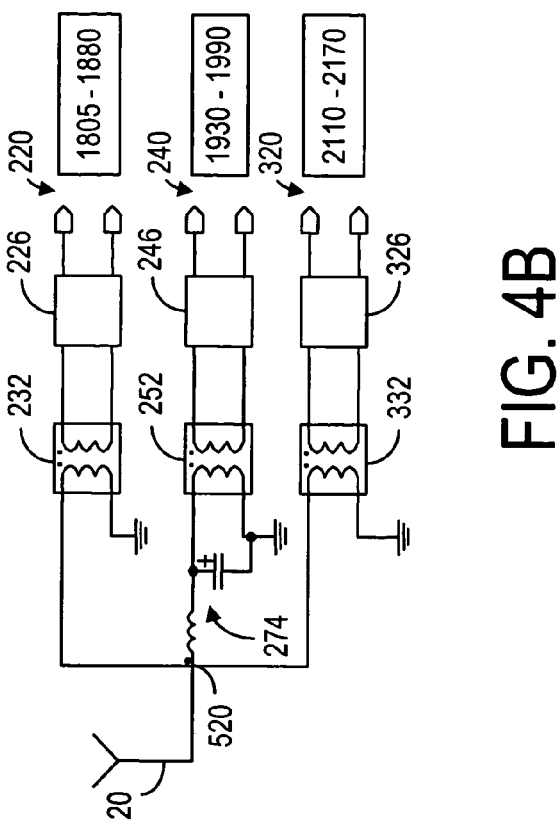
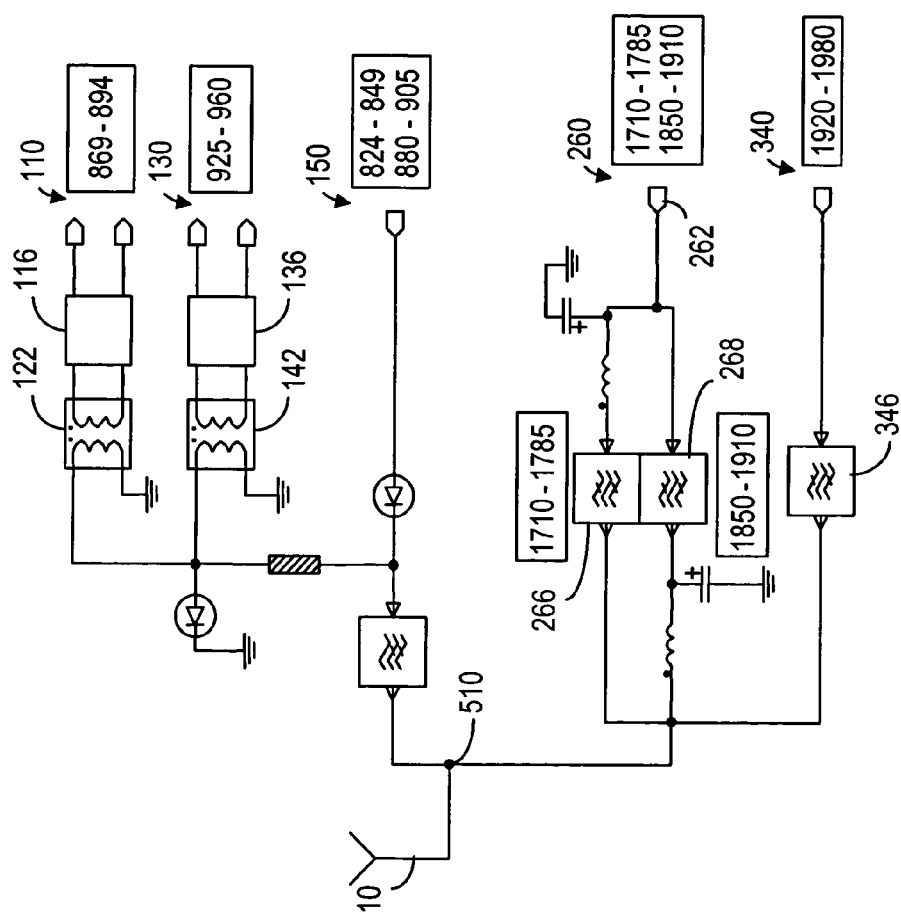
FIG. 4B
FIG. 4A

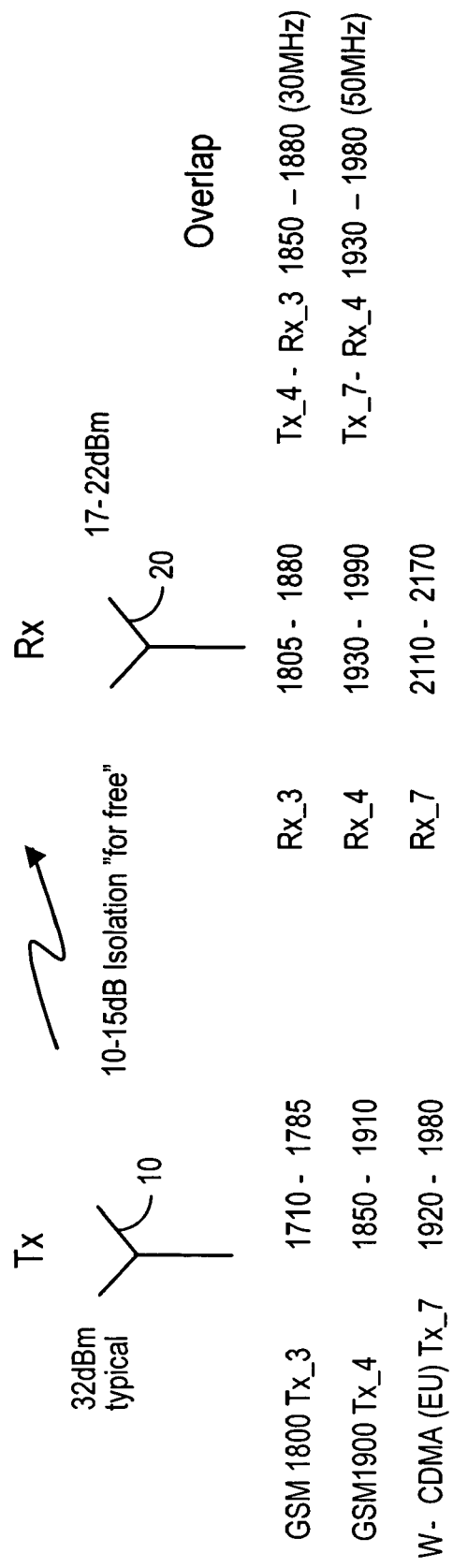
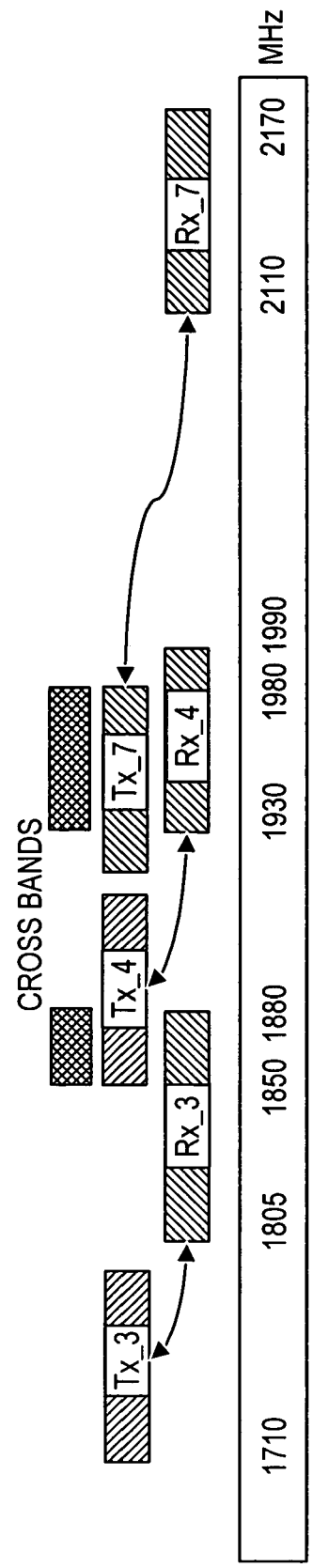
FIG. 6A
FIG. 6B

FRONT-END ARRANGEMENTS FOR MULTIBAND MULTIMODE COMMUNICATION ENGINES

CROSS REFERENCES TO RELATED APPLICATIONS

This application is related to U.S. patent application Ser. No. 10/118,657, filed Apr. 8, 2002, and assigned to the assignee of the present application. This application is also related to patent applications Ser. No. 10/688,807 and Ser. No. 10/688,181, assigned to the assignee of the present application and filed even date herewith.

FIELD OF THE INVENTION

The present invention relates generally to front-end topology and, more particularly, to front-end arrangement for multiband and/or multimode mobile cellular handset electronics.

BACKGROUND OF THE INVENTION

The term "front-end" as used in this disclosure, means the components and functions between the antennas and the power amplifiers or RF-ASIC (radio frequency application specific integrated circuit), but some front-end modules may also include power amplifiers. The front-end in multiband, multimode engines, especially those that are designed to meet the requirement of MIMO (multiple-input, multiple-output) and/or diversity functionality, is usually very complex in construction and design. Because the front-end generally comprises many switches, it consumes a significant amount of electrical current and needs many control lines. MIMO functionality is required in new and future mobile terminals and, initially, Rx MIMO is prioritized because the downlink data rate is more important than the uplink counterpart in mobile communications. Essentially, Rx MIMO requires more than one Rx path to be provided on a particular band of operations. The outputs of these paths are then monitored and combined to give an enhanced data rate. The antenna feed to each of these paths is independent from each other.

Currently, a GSM/W-CDMA multimode engine is designed to have a separate GSM antenna and a separate W-CDMA antenna. A W-CDMA antenna is connected to a duplexer that has a passband filter for both the Rx and Tx paths of the W-CDMA mode. The GSM antenna is connected to an antenna switch module that typically first separates the 1 GHz frequencies from the 2 GHz bands using a diplexer or the like. The Rx and Tx paths of each frequency range are then separated by switches. The antenna switch module often also includes harmonic filtering for the power amplifier outputs and may include surface-acoustic wave (SAW) filters to provide filtering for the Rx paths. A typical block diagram of a typical front-end is shown in FIGS. 1a and 1b. As shown in FIG. 1a, the GSM module includes four sections: 1 GHz GSM Rx section, 1 GHz GSM Tx section, 2 GHz GSM Rx section and 2 GHz GSM Tx section. The 1 GHz GSM Rx section includes an 869–894 MHz Rx path 110, and the 925–960 MHz Rx path 130. The 1 GHz GSM Tx section, collectively denoted as path 150, includes two frequency bands of 824–849 MHz and 880–905 MHz. The 869–894 MHz Rx path 110 includes a filter 116 connected between ports 112 and a balun 122. The 925–960 MHz Rx path 130 includes a filter 136 connected between ports 132 and a balun 142. The balun functionality can be incorporated into the filters 116 & 136 depending on the filter technology. The Rx paths 110 and 130 are joined at a common node 410. These Rx paths are also joined with the port 152 of the 824–849/880–905 MHz Tx path 150 at a node 412 via a matching element 80. Here PIN diodes 42 and 44 are used for Tx-Rx switching. Alternatively, other switch technologies can be also used e.g. CMOS or GaAs p-HEMTs (Pseudomorphic High Electron Mobility Transistor). However, by using the CMOS and p-HEMT switches, the arrangement of biasing and matching elements will be slightly modified.

The 2 GHZ Rx section includes a 1805–1880 MHz Rx path 220, commonly referred to as the 1800GSM mode, and the 1930–1990 MHz Rx path 240, commonly referred to as the 1900GSM mode. The 2 GHz GSM Tx section, collectively denoted as path 260, includes two frequency bands of 1710–1758 MHz and 1850–1910 MHz. The 1805–1880 MHz Rx path 220 includes a filter 226 connected between ports 222 and a balun 232. The 1930–1990 MHz Rx path 240 includes a filter 246 connected between ports 242 and a balun 252. The Rx paths 220 and 240 are joined at a common node 414 with matching circuits or devices 84, 86. These Rx paths are also joined with the port 262 of the 1710–1758/1850–1910 MHz Tx path 260 at a node 416 via a matching element 82. Here PIN diodes 46, 48 are used for Tx-Rx switching. The 1 GHz and 2 GHZ parts are connected to a common feed point 418 of the GSM antenna 10 through a diplexer 30, which comprises harmonic filters 32, 34 for the Tx paths 150 and 260.

In FIG. 1b, the W-CDMA module has two paths: a 2110–2170 MHz Rx path 320 and a 1920–1980 MHz Tx path 340. The Rx path 320 includes a filter 326 connected between ports 322 and a balun 332. However, the balun can also be after the filter and external to the duplexer. The 1920–1980 Tx path 340 has a passband filter 346 and a port 342. The Rx path 320 is joined with the Tx path 340 at a node 420 and a common W-CDMA antenna 20 via a matching element 90.

To use one antenna for the GSM mode and one antenna for the W-CDMA mode, it is required that the front-end includes matching devices 80, 82, 84, 86 and other necessary components for matching and biasing, depending also on the switch technology chosen, to separate the 1805–1880 MHz GSM Rx path 220 and the 1930–1990 MHz GSM Rx path 240. The front-end architecture is complex and the additional losses in these reception paths occur.

It is advantageous and desirable to provide a front-end architecture where the complexity can be reduced.

SUMMARY OF THE INVENTION

The present invention reduces the complexity of frond-end design by combining one or more 2 GHz GSM Rx paths with one or more W-CDMA paths. With such a combination, the number of matching elements and the switching components can be reduced or even eliminated. As a result, the current consumption and the losses in the front-end engines can also be reduced.

Thus, according to the first aspect of the present invention, there is provided a receive front-end module for use in conjunction with a transceive front-end module in a multi-band communication device, the communication device having at least a first antenna and a second antenna electrically separated from the first antenna, wherein the transceive front-end module comprises a plurality of signal paths operatively connected to the first antenna for transmitting signals in at least a first transmit frequency band and a different second transmit frequency band. The receive front-end module comprises:

a feed point, operatively connected to the second antenna for receiving communication signals in the communication device; and a plurality of receive signal paths, operatively connected to the feed point for receiving communication signals in a plurality of frequency bands, wherein said plurality of frequency bands includes at least a first receive frequency band, which is partially overlapped with the first transmit frequency band in the transceive front-end module, and a second receive frequency band, which is spaced from the first receive frequency band in frequency.

The first transmit frequency band comprises a frequency range substantially from 1850 MHz to 1910 MHz, and the first receive frequency band comprises a frequency range substantially from 1805 MHz to 1880 MHz.

Alternatively, the first transmit frequency band comprises a frequency range substantially from 1920 MHz to 1980 MHz, and the first receive frequency band comprises a frequency range substantially from 1930 MHz to 1990 MHz.

The second receive frequency band is partially overlapped with the second transmit frequency band, and the second transmit frequency band comprises a frequency range substantially from 1850 MHz to 1910 MHz, and the second receive frequency band comprises a frequency range substantially from 1805 MHz to 1880 MHz.

Alternatively, the second receive frequency band comprises a frequency range substantially from 2110 MHz to 2170 MHz. But this frequency band can also be a third frequency band.

Preferably, the receive front-end module of claim 7, wherein further comprising at least one matching circuit, operatively connected to the plurality of receive signal paths, for impedance matching.

The matching circuit comprises at least one capacitive element, one inductive element or distributed element.

Advantageously, the receive front-end module further comprises a plurality of filters disposed in the plurality of signal paths for filtering signals in corresponding frequency ranges. The filters can be surface acoustic wave filters, or bulk bulk acoustic wave filters.

Advantageously, the receive front-end module further comprises:

a plurality of baluns, each balun disposed between the feed point and one of the filters. The baluns can be acoustic baluns, or they are integrated with the filters.

The filters can also have a single-to-balanced function included therein.

Advantageously, the receive front-end module further comprises:

at least one isolation component, operative connected to at least one of the receive signal paths, for providing cross-band isolation between the transmitted signals and the received signals. The isolation component comprises:

at least one switching element, such as a pin diode or a solid switching device, operatively disposed between the feed point and said at least one of the receive signal paths, for carrying out said isolation.

Alternatively, the isolation component comprises:

a plurality of signal amplifiers disposed in the receive signal paths for isolating the communication signals.

Advantageously, the receive front-end module further comprises at least one matching circuit, operatively connected to the feed point, for matching the filters.

According to the second aspect of the present invention, there is provided a method of reducing reception loss in a portable communication device, the communication device having a first antenna;

a second antenna electrically separated from the first antenna;

a plurality of transmit signal paths for transmitting communication signals in at least a first transmit frequency band and a different second transmit frequency band;

a plurality of receive signal paths for receiving communication signals in a plurality of frequency bands, including at least a first receive frequency band, which is partially overlapped with the first transmit frequency band, and a second receive frequency band spaced from the first receive frequency band in frequency. The method comprises the steps of:

operatively connected the transmit signal paths to a first antenna; and operatively connected the receive signal paths to the second antenna so that the communication signals in the first transmit signal band and the communication signals in the first receive signal band are conveyed via different antenna.

Advantageously, the method further comprises the step of impedance matching the plurality of receive signal paths.

Advantageously, the method further comprises the step of providing a plurality of filters in the plurality of receive signal paths for filtering signals in corresponding frequency ranges.

Advantageously, the method further comprises the step of providing a balun between the second antenna and each of said plurality of filters.

Advantageously, the method further comprises the step of providing an isolation circuit in at least one of the receive signal paths for cross-band isolation between the transmitted communication signals and received communication signals.

Advantageously, the method further comprises the step of providing a plurality of signal amplifiers in the plurality of receive signal paths for cross-band isolation between the transmitted communication signals and the receive communication signals.

According to the third aspect of the present invention, there is provided a portable communication device, comprising:

at least a first antenna;

a second antenna electrically separating from the first antenna;

a transceive front-end module comprises a plurality of signal paths operatively connected to the first antenna for transmitting signals in at least a first transmit frequency band and a different second transmit frequency band; and a receive front-end module comprising:

a feed point, operatively connected to the second antenna for receiving communication signals in the communication device, and a plurality of receive signal paths, operatively connected to the feed point for receiving communication signals in a plurality of frequency bands, wherein said plurality of frequency bands includes at least a first receive frequency band, which is partially overlapped with the first transmit frequency band in the transceive front-end module, and a second receive frequency band, which is spaced from the first receive frequency band in frequency.

The portable communication device can be a mobile terminal, a communicator device or the like.

The present invention will become apparent upon reading the description taken in conjunction with FIGS. 2a to 9.

BRIEF DESCRIPTION OF THE DRAWINGS

FIG. 1a is a block diagram illustrating a GSM part of a prior art front-end module.

FIG. 1b is a block diagram illustrating a W-CDMA part of the same prior art front-end module.

FIG. 2a is a block diagram illustrating a GSM part of an embodiment of the front-end module, according to the present invention.

FIG. 2b is a block diagram illustrating a mixed GSM/W-CDMA part of the front-end module of FIG. 2a.

FIG. 4a is a block diagram illustrating a mixed GSM/W-CDMA 2 GHz Tx module in combination with a 1 GHz GSM Tx/Rx module, according to the preferred embodiment of the present invention.

FIG. 4b is a block diagram illustrating a mixed GSM/W-CDMA 2 GHz Rx module, according to the preferred embodiment of the present invention.

FIG. 6a is a schematic representation showing the Tx-Rx antenna isolation in GSM/W-CDMA front-end, according to the present invention.

FIG. 6b is a frequency chart showing the overlapping in GSM and W-CDMA frequencies.

DETAILED DESCRIPTION OF THE INVENTION

Figure 9:
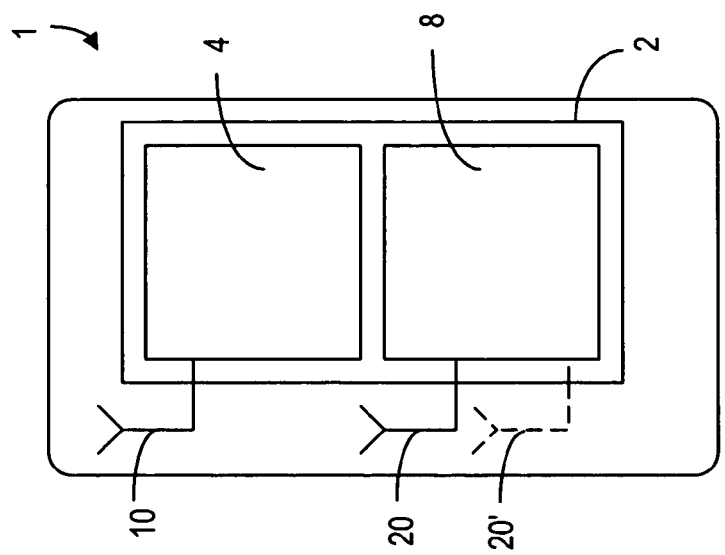
FIG. 9 is a schematic representation showing a mobile terminal having a transceiver front-end, according to the present invention.

The upper (2 GHz) GSM band Rx and Tx performance in a multiband, multimode mobile terminal (or a communicator device and the like) can be improved by relocating some of the GSM and W-CDMA paths in the front-end of the engine. The mobile terminal 1 is schematically shown in FIG. 9, which shows a transceiver front-end 2 comprising a first module 4 operatively connected to an antenna 10, and a second module 8 operatively connected to an antenna 20. The second module 8 may have one or more antenna 20' for Rx MIMO/diversity purposes.

According to one embodiment of the present invention, the 1800GSM Rx (1805–1880 MHz) is moved from the antenna switch to the W-CDMA duplexer. As shown in FIG. 2a, the 2 GHz part of the GSM module has only one Rx path 240: 1900GSM Rx (1930–1990 MHz). As such, the matching elements 84 and 86 (see FIG. 1a) can be eliminated. The 1800GSM Rx path 220 shares the upper band antenna 20 of the W-CDMA module, as shown in FIG. 2b. Because of the different operation modes between the W-CDMA duplexer (Rx path 320 and Tx path 340) and the GSM, the 1800GSM Rx path 220 can be directly connected to the node 422, without the need of switches. Only one matching element 92 is used to match one of the filters. This arrangement reduces the losses of this specific Rx band up to 2 dB due by avoiding the losses caused by the switches for Tx-Rx switching and the diplexer 30 or the like (see FIG. 1a). It should be noted that the switching as shown in FIG. 2a is accomplished by PIN diodes in a series (48)/shunt (46) configuration, requiring a $\lambda/4$ transmission line or a 90 degree phase shifter (82). However, there are also other alternatives: both of the diodes could be in series, and the diodes can also be replaced by CMOS switches, p-HEMT switches or the like.

Figure 3:
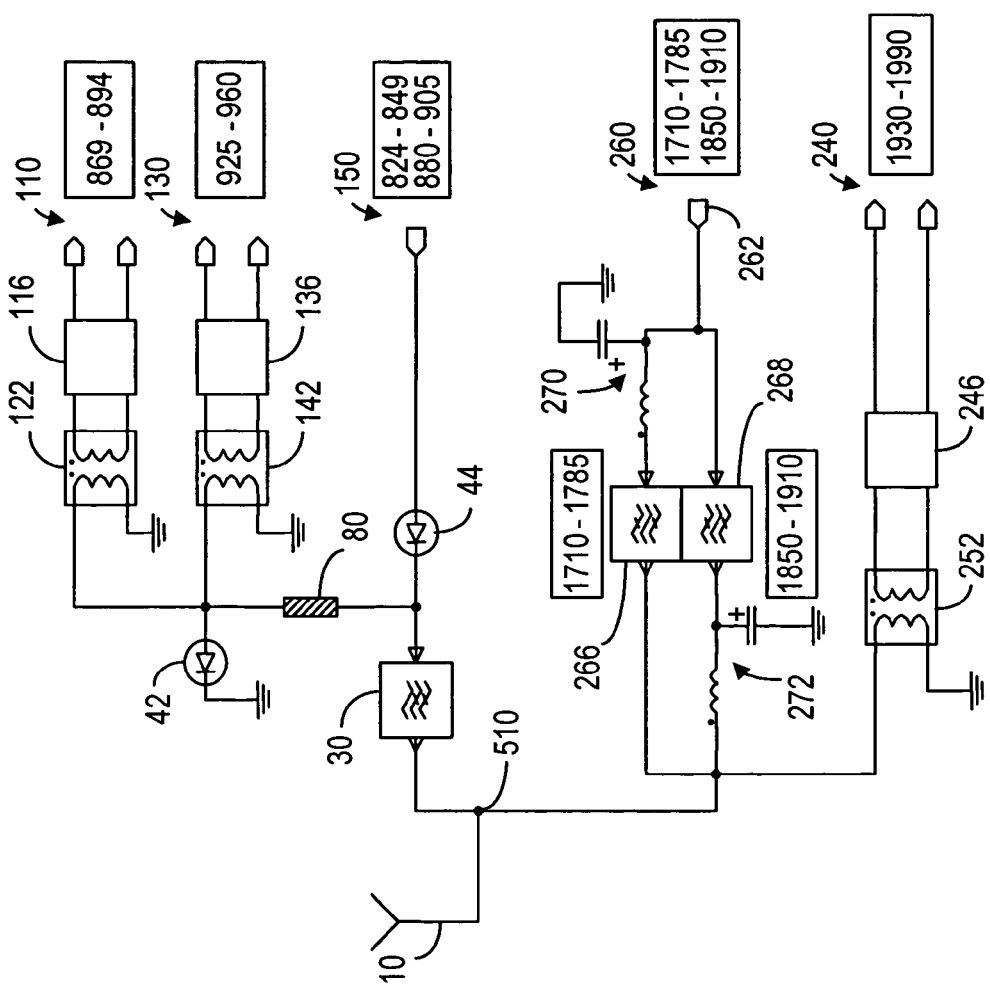
FIG. 3 is a block diagram illustrating a different embodiment of the GSM part of the front-end module, according to the present invention.

A further improvement for reducing the losses of the 1900GSM Rx and the 1800 & 1900GSM Tx can be realized by using separate passband filters in the (1710–1758)/(1850–1910) GSM Tx path 260. As shown in FIG. 3, a separate matching circuit 270 and a separate passband filter 266 are used for the 1800GSM Tx (1710–1785 MHz), and a separate matching circuit 272 and a passband filter 268 are used for the 1900GSM Tx (1850–1901 MHz). As such, the switching elements 46, 48 and 82 (see FIG. 2a) and the harmonic filter 34 are eliminated and replaced by selective Tx passband filters 266, 268. These two passband filters are matched at both ends with circuits 270, 272, which are passive elements that can be integrated into the module, for example. The removal of the switches and the diplexer/harmonic filter renders it possible to match all three filters to one single antenna feed point 510 without switching. In this arrangement, the 1900GSM Rx filter 246 and the corresponding 1900GSM Tx filter 268 act like a duplexer. Thus, insertion loss can be reduced.

Moreover, the 1920–1980 MHz W-CDMA path 340 in the FIG. 2b and the 1900GSM Rx path 240 in FIG. 3 can change places, as shown FIGS. 4a and 4b. As shown in FIG. 4a, the 1920–1980 MHz W-CDMA Tx path 340 is directly connected to the antenna feed point 510 without the need of the matching element 92 (see FIG. 2b). As shown in FIG. 4b, although there are three Rx paths 220, 240, 320 connected to the antenna 20 with one antenna feed point 520, only one matching circuit 274 is needed for matching one of the filters. Such arrangement provides additional benefits.

In the arrangement as shown in FIGS. 4a and 4b, all the upper band Rx and Tx paths are separated. The upper band Rx paths are connected to the antenna 20, while the upper band Tx paths are connected to the antenna 10. As such, the Rx and Tx antennas 10, 20 can be unbalanced antennas, with each antenna in a separate module. Furthermore, each module has three filters for the upper band that are matched to one single feed point with one matching element. As with the switching elements 48, 46, 82 in FIG. 2a, the matching elements in FIG. 4a can be replaced by CMOS or p-HEMT switches.

The separate antennas for the Rx and Tx paths provide some "for free" Tx to Rx attenuation. The term "for free" in this context means that, in order to have more than one antenna that are not too much influenced by each other (loading conditions at antenna port etc), there must be a certain amount of isolation between the antennas, typically 10 dB being a minimum requirement. This is the case even in the conventional GSM vs W-CDMA antenna arrangement. This means that, with a proper Rx and Tx arrangement, the 10 to 20 dB of isolation can be used to attain some of the required Tx to Rx isolation as well. This results in some relaxation in the duplexing requirements. Furthermore, the Rx antenna 20 can now be optimized for omni-directionality. Likewise, the upper band Tx antenna 10 can be optimized to achieve as low SAR (specific absorption rate) as possible for low radiation mobile phones. Moreover, because the impedance level of the Rx chain is typically higher than that of the Tx counterpart, the antenna impedance can be designed to suit the upper band Rx and upper band Tx only, when the Rx and Tx chains are connected to different antennas.

The methods as discussed above can be used in a front-end engine for U.S. current or future W-CDMA frequencies, or in a front-end engine having mixed use of European and U.S. W-CDMA frequencies. More particularly, the present invention is applicable to any given set of at least three frequency bands that are close, but not overlapping in frequency. For example, the 2 GHz GSM Tx path 260 as shown in FIG. 4a can also be used for the current U.S. W-CDMA (US1, Tx 1850–1910 MHz) and the new U.S. W-CDMA (US2, Tx 1710–1755 MHz). These modes share the same antenna 10 with the EU W-CDMA Tx path 340. Likewise, the 1900GSM Rx path 240 as shown in FIG. 4b can also used for the current U.S. W-CDMA (US1, Rx 1930–1990 MHz), and the European W-CDMA Rx path 320 can also be used for the new U.S. W-CDMA (US2, Rx 2110–2155 MHz). It should be noted that the W-CDMA US2 Rx has a smaller bandwidth than the European counterpart (2110–2170 MHz). Furthermore, not all of the GSM and W-CDMA bands have to be implemented on a Tx/Rx system. In order to accommodate different W-CDMA standards the relevant-filters-must be-designed-to-have different passband frequencies.

Figure 5B:
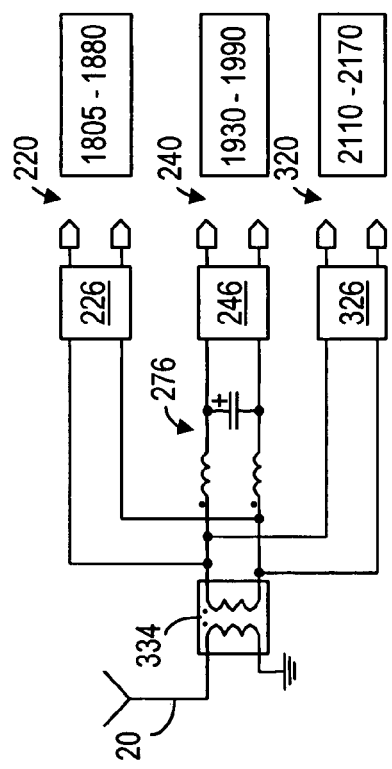
FIG. 5b is a block diagram illustrating another embodiment of the GSM/W-CDMA 2 GHz Rx module.
Figure 5A:
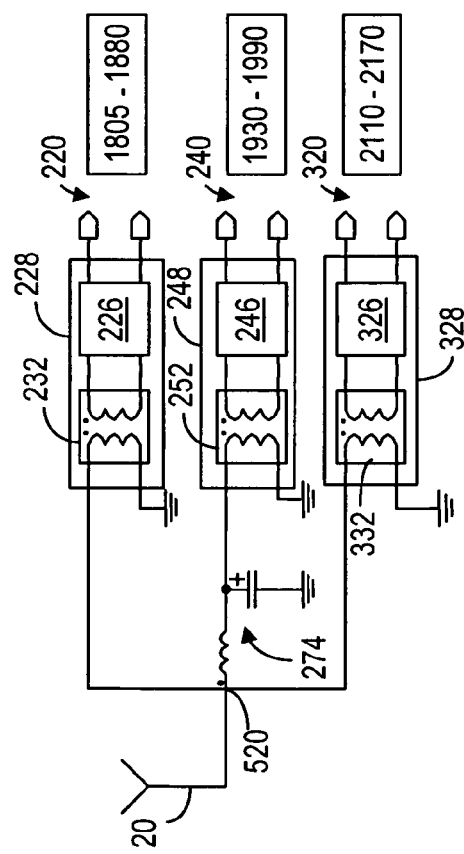
FIG. 5a is a block diagram illustrating a different embodiment of the GSM/W-CDMA 2 GHz Rx module.

FIGS. 5a and 5b shows different embodiments of the 2 GHz Rx module as shown in FIG. 4b. The filters 226, 246 and 326 in these different embodiments are either fully balanced and each is associated with a balun in front thereof, or each of filters has a single to balanced function included therein (acoustic balun). As shown in FIG. 5a, the balun and the filter in each path are integrated into a filter that includes the single to balanced transformation. The filters that have the single to balanced transformation in the Rx paths 220, 240 and 320 are denoted by reference numerals 228, 248 and 328, respectively.

When separate baluns 232, 252, 332 are used, as shown in FIG. 4b, each of them covers the frequency range of the corresponding filter (226, 246, 326). Alternatively, one balun 334 is used for all three paths 220, 240 and 320, as shown in FIG. 5b. In this case, the balun 334 covers the entire frequency ranges of the three filters 226, 246 and 326, and one matching element 276 is used to match one of the filters. The filters can be either SAW (surface acoustic wave) filters or BAW (bulk acoustic wave) filters. With three filters in one Rx module, as shown in FIGS. 4b and 5a, only the filter with the frequency that lies between the lowest and the highest frequency bands needs a matching element, which can be typically implemented with one capacitor and one or more inductors. The matching can also be carried out using striplines or different arrangements of coils and capacitors. The matching of at least three filters to a single point is generally possible if the frequency separation among these filters is not too small (the matching with a frequency separation of 1 GHz or 2 GHz is straightforward). The limit of the frequency separation depends on the filter technology and selectivity requirements, but a typical minimum is around 1% of the center frequency (i.e. filters close to 2 GHz, for example the GSM 1800 and 1900, W-CDMA 2110 Rx filters, are possible to match since the separation between the upper passband edge of 1800 and the lower edge of 1900 have a separation of 20 MHz and a larger separation to the W-CDMA Rx). In the above example, the three different frequency ranges are 1805–1880 MHz, 1930–1990 MHz and 2110-2170 MHz.

The separation of Rx and Tx antennas in the upper bands together with the steep Rx filters provides sufficient Tx to Rx isolation to render any additional Tx/Rx switching unnecessary. Furthermore, it is possible to design the filters so that they are selective enough to achieve Tx to Rx isolation. However, the problem of cross band isolation remains to be solved. This problem arises from the fact that even though the Tx and Rx bands of a given standard do not overlap, there may be, in a multiband engine, overlapping between Tx frequencies of one standard and Rx frequencies of another standard. For example the 1900GSM standard has its Tx mode at 1850–1910 MHz and the corresponding Rx mode at 1930–1990 MHz (thereby having a separation of 20 MHz). The Tx mode does partially overlap with the 1800GSM Rx, which is operated at 1805–1880 MHz. This means that even when the signal from the Tx antenna is correctly attenuated in the 1900GSM Rx filter, the signal is able to pass trough the 1800GMS Rx filter. From the system point of view this is problematic because the next element in the Rx chain is usually an LNA (low noise amplifier), which is already integrated on to an RF-ASIC. Even though the LNA for the 1800GSM would be in the OFF state, sufficiently high signal levels may exist at the input to the RF-ASIC die, e.g. the bondwires, causing interference in the operation of the RF-ASIC. This is especially true for modern RF-ASIC that operates on very low supply voltages like 1.2V. In such a case, a high level input signal may even damage the RF-ASIC itself. Moreover, the only attenuation in these cross band situations is provided by the separate antennas and is about 10–15 dB. This attenuation is not enough. These potential cross band frequencies are shown in FIGS. 6a and 6b for the case involving 1800GSM, 1900GSM and the European W-CDMA.

As shown in FIG. 6a, the upper band Tx chain connected to the antenna 10 includes 1800GSM Tx_3 (1710–1785 MHz): 1900GSM Tx_4 (1850–1910 MHz) and W-CDMA (EU) Tx_7 (1920–1980 MHz), and the upper band Rx chain connected to the antenna 20 includes 1800GSM Rx_3 (1805–1880 MHz), 1900GSM Rx_4 (1930–1990 MHz) and W-CDMA (EU) Rx_7 (2110–2170 MHz). Thus, the frequency overlap in these chains is: Tx_4–Rx_3 (30 MHz, from 1850 to 1880 MHz), and Tx_7–Rx_4 (50 MHz, from 1930 to 1980 MHz). The cross band problems are also illustrated in FIG. 6b. If the maximum output power at the antenna in Tx mode is 30 to 33 dBm (depending on system standard) and a typical isolation that can be achieved between two separate antennas is between 10 to 20 dBm, for example, then the power level at the Rx antenna is from 13 to 23 dBm. In such a case, the antennas do provide some free Tx to Rx isolation, but for the crossband this is not sufficient, since a typically acceptable maximum power level at the Rf-ASIC input (Rx path) is around 0 dBm during Tx time slot (i.e. LNAs in ASIC are off). Therefore, some means of providing additional attenuation in these cross band cases is needed.

Figure 7A:
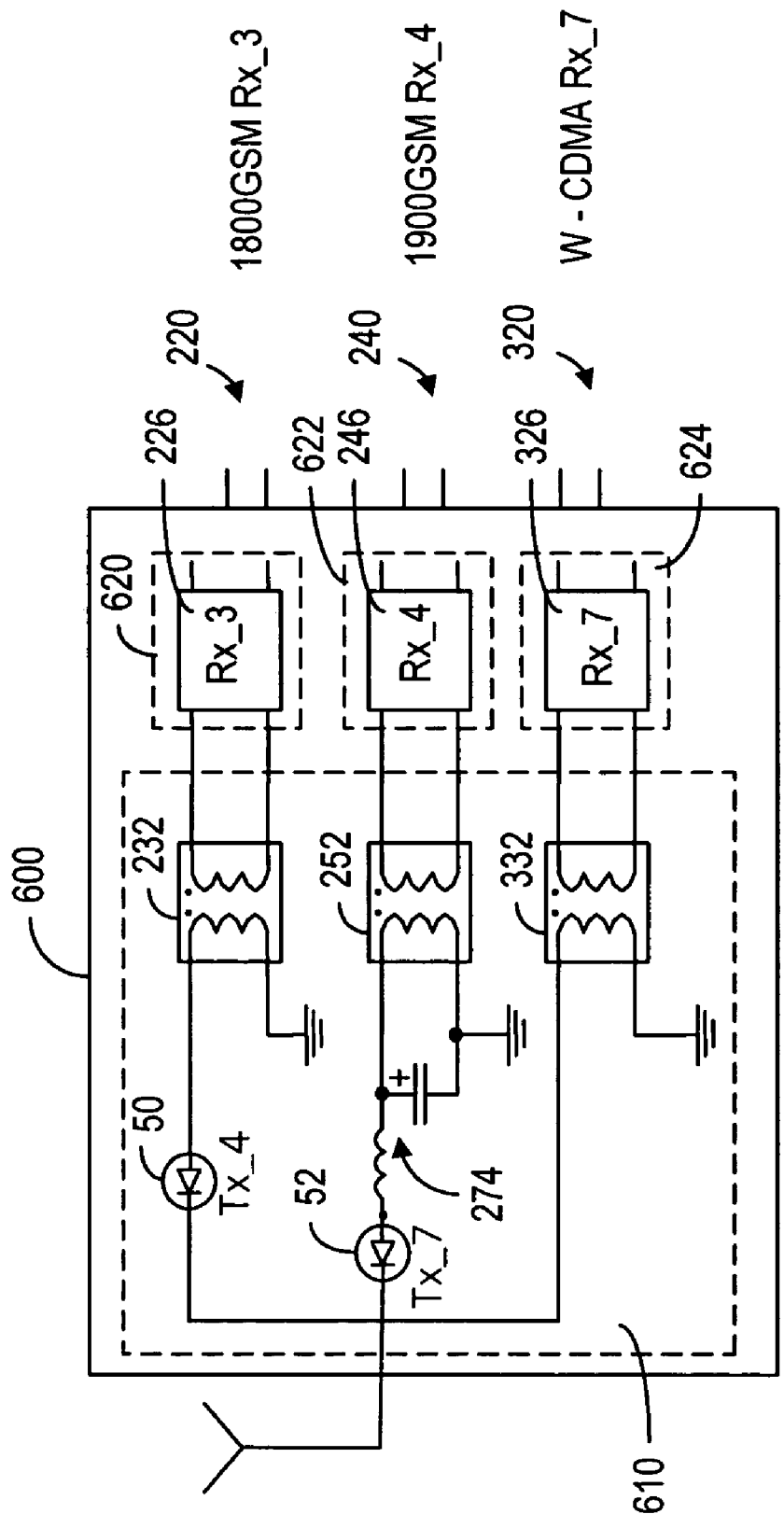
FIG. 7a is a block diagram illustrating the use of switches to solve the cross-band isolation problem in the GSM/W-CDMA 2 GHz Rx module in a transceiver.

Sufficient cross band isolation can be achieved in a multiband engine by basically two methods: either implementing switching in the Rx paths that are problematic, or moving some or all of the LNAs from the ASIC to the Rx module. The switches provide adequate increase in isolation, but also increase the insertion loss (the switches can have different arrangement, e.g. in shunt to ground). Cross-band isolation in the 2 GHz Rx module using switches is shown in FIG. 7a. For example, a PIN diode 50 is used as a switch in the 1800GSM Rx path 220 such that the PIN diode 50 is switched off when the 1900GSM Tx mode is used in order to provide good isolation to the 1800GSM Rx path 220. Likewise, a PIN diode 52 is used as a switch in the 1900GSM Rx path 240 such that the PIN diode 52 is switched off when the European W-CDMA Tx mode is used in order to provide good isolation to the 1900GSM Rx path 240. As shown in FIG. 7a, the passive elements including the baluns 232, 252, 332, the matching element 274 and the switches 50, 52 can be integrated into a sub-module 610. The filters 226, 246 and 326 are separately fabricated as discrete sub-modules 620, 622 and 624. All these sub-modules can be assembled into an Rx module 600.

The LNAs method can, in principle, provide this isolation as a bonus, since an unbiased (=OFF) LNA has very good isolation (from input to output) and hence the signal level at the output of a LNA in the OFF state is small enough for the RF-ASIC. Moving the LNAs out from the RF-ASIC to the filter module also has several other benefits that are discussed later.

Figure 7B:
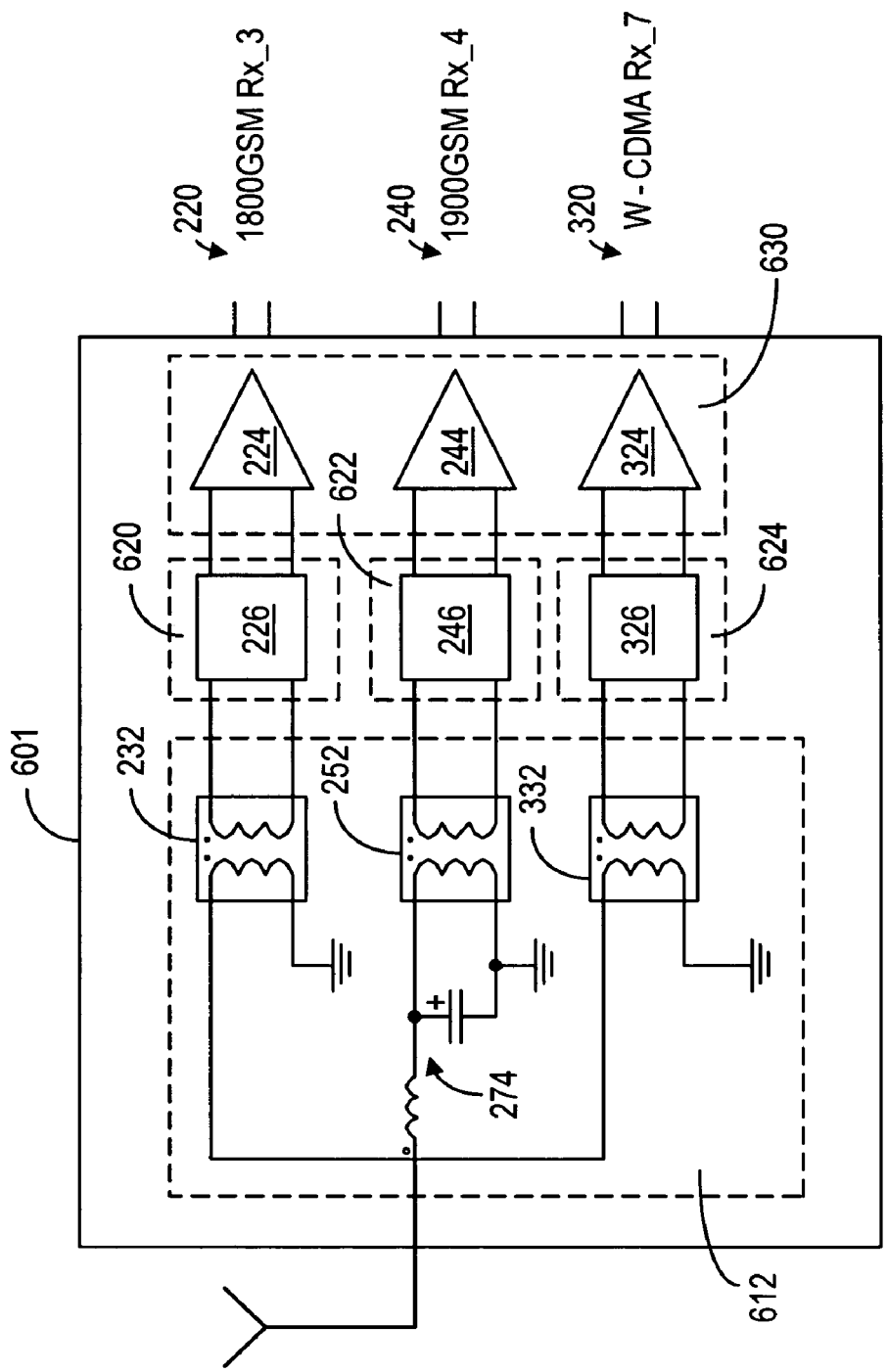
FIG. 7b is a block diagram illustrating the use of low noise amplifier to solve the cross-band problem in the GSM/W-CDMA 2 GHz Rx module in a transceiver.

Cross-band isolation using LNAs is shown in FIG. 7b. As shown, three low noise amplifiers 224, 244 and 324 are used, respectively, in the 1800GSM Rx path 220, 1900GSM Rx path 240 and W-CDMA Rx path 320. The low noise amplifiers 224, 244 and 324 are integrated in a sub-module 630. The passive elements including the baluns 232, 252, 332 and the matching element 274 are integrated into a sub-module 612. The filters 226, 246 and 326 are separately fabricated as discrete sub-modules 620, 622 and 624. All these sub-modules can be assembled into an Rx module 601. When operating at 1900GSM Rx mode, only the LNA 244 is ON, and the 1800GSM LNA 224 is OFF in order to provide necessary isolation. Similarly, when operating at W-CDMA (EU or US2) with the Rx path 320, only the LNA 324 is ON. The 1900GSM LNA 244 is OFF. The advantages of such an arrangement include that the LNA at the OFF-state provides isolation "for free" and it works as a switch, and that the matching between the filters and the LNAs can be designed to achieve optimal performances. It should be noted that only the bipolar process is required for the low noise amplifiers. An RF-ASIC can be made of CMOS.

Figure 7C:
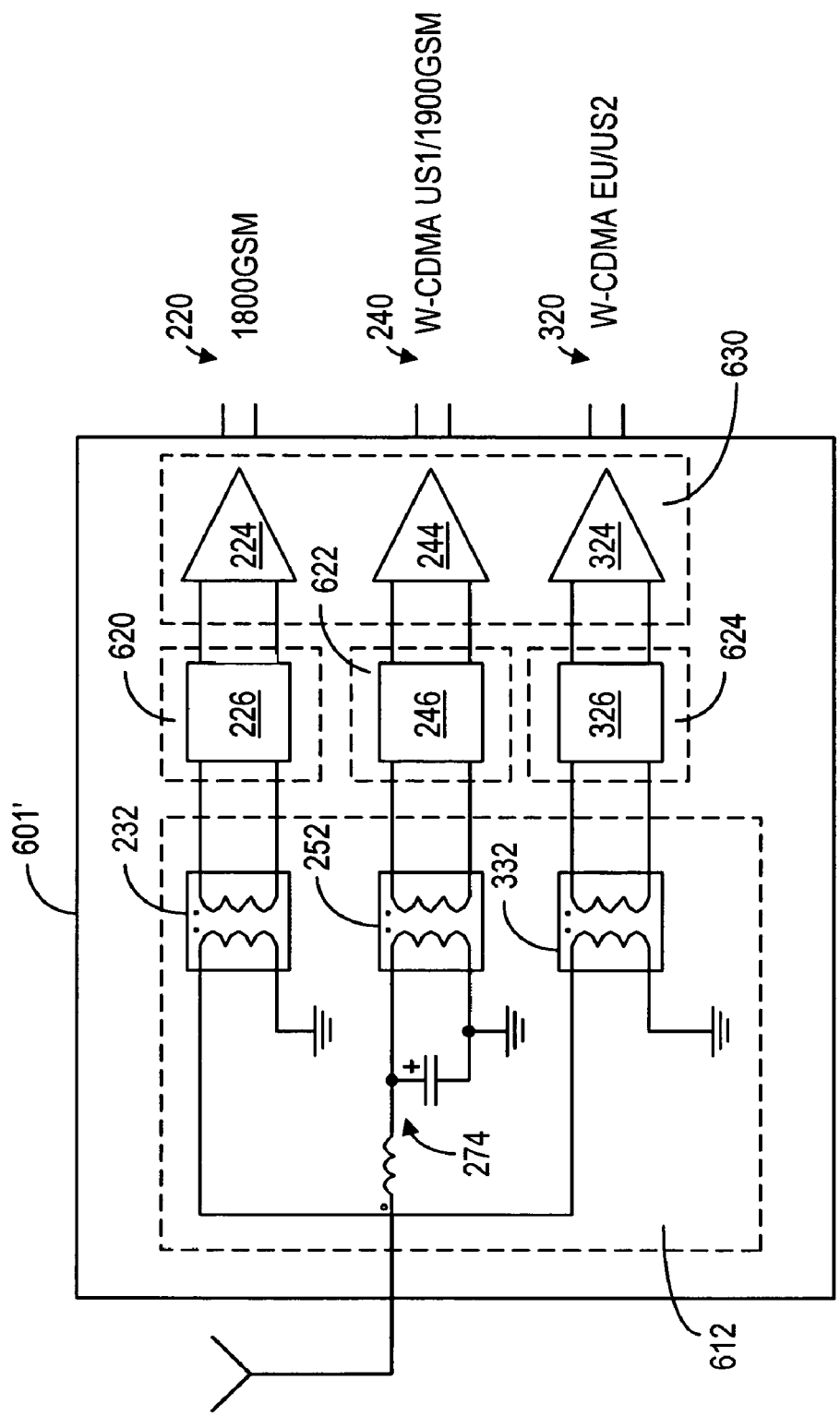
FIG. 7c is a block diagram illustrating the single-antenna receive module of FIG. 7b in a "WORLD" WCDMA EU/US2/US1 & 1800/1900 GSM Rx combination.

If the baluns in the Rx modules are not acoustic baluns, as those shown in FIGS. 5a, 7a and 7b, they can be integrated with passive matching elements on e.g. very small silicon chips. It should be noted that the 1900GSM Rx path 240 is also used for the current U.S. W-CDMA (US1) Rx mode, and the European W-CDMA Rx path 320 is also used for the new U.S. W-CDMA (US2) Rx mode, as shown in FIG. 7c. The receive module as shown in FIG. 7c is a single-antenna module in a "WORLD" W-CDMA EU/US2/US1 and 1800/1900GSM Rx combination.

An additional benefit of separating the upper band RX and Tx is that the front-end architecture is well suited to support Rx-MIMO/diversity functionality.

In a MIMO receive module, at least two of the signal paths connected to two different antennas are used simultaneously to receive signals of the same mode in the same frequency band. For example, in the W-CDMA EU/US2 MIMO and 1800GSM Rx combination.

Figure 8:
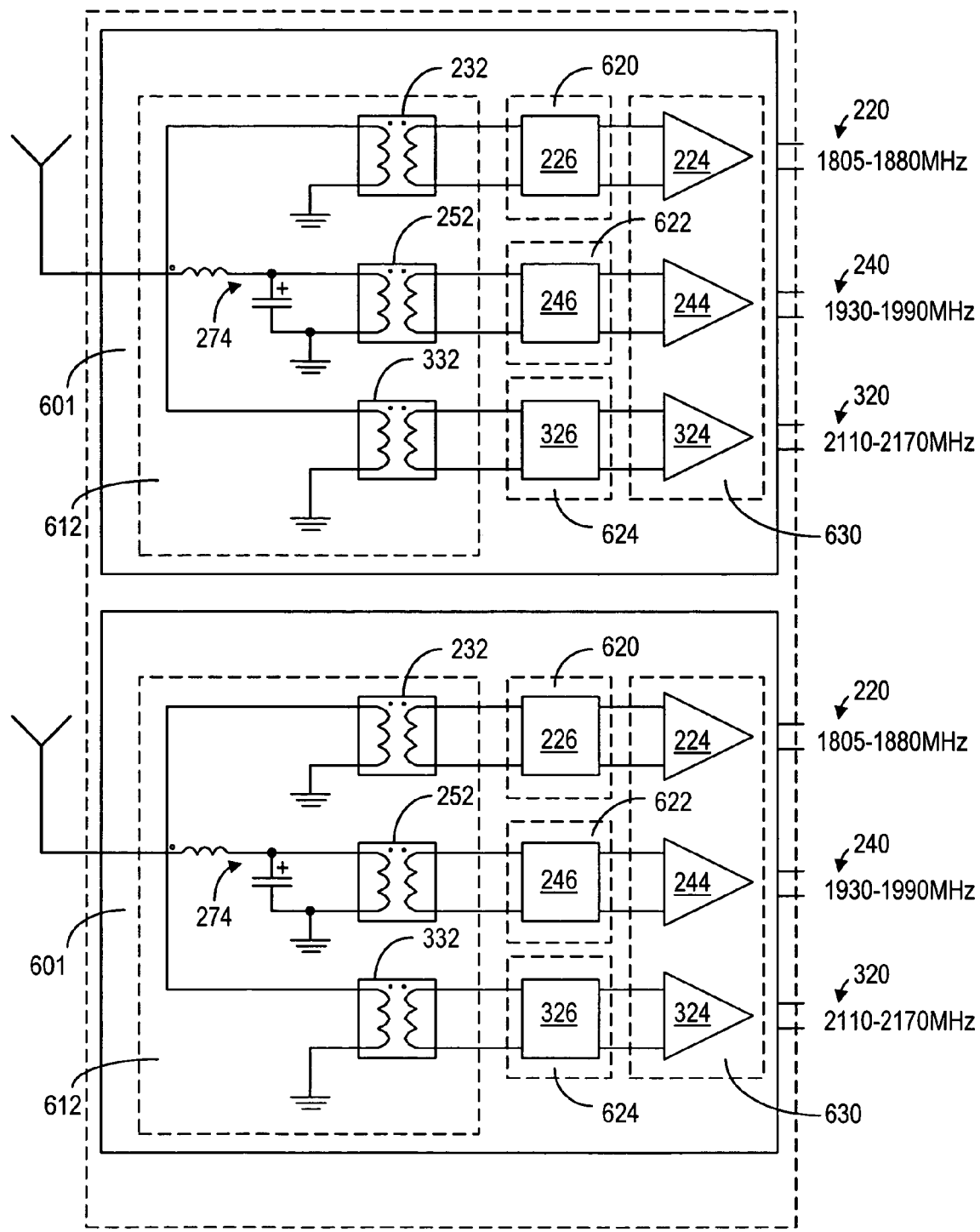
FIG. 8 is a block diagram illustrating a Diversity combination of two identical Rx modules.

In diversity, the only requirement is the duplicating of the module. For example, two identical Rx modules 601 can be used side-by-side, as shown in FIG. 8. In such case, only one Tx module (FIG. 4a, for example) is necessary.

In the modules that contain upper band Tx paths, such as 1800 & 1900GSM Tx paths 260 and/or W-CDMA (EU) Tx path 340, the 1800GSM Tx band and the 1900GSM Tx band, in most cases, are provided from one common power amplifier (PA). Thus, the Tx filtering of the upper band GSM Tx path can be done with one harmonic filter, such as filter 34 in FIG. 2a, that has a wide enough passband to cover both GSM Tx bands. Alternatively, Tx filtering is achieved by using two passband filters, such as filters 266, 268 in FIGS. 3 and 4a, that are matched to each other at both the output end and the input end. The W-CDMA Tx path 340 requires a separate filter, such as passband filter 346 in FIG. 4a. Any of the harmonic filter 34, passband filters 266, 268 and 346 can be a balanced filter, or a filter that performs a single to balance transformation, depending on whether any of the power amplifiers has a differential output.

The 1GHz GSM bands 110, 130, 150 are either connected to the Tx or the Rx antenna using a conventional antenna switch approach. That is, one of the antennas has to be designed such that it also has a resonance at 1 GHz. The main reason for this is that the 1 GHz antenna is the largest one and it is seen, therefore, as not feasible to have separate Tx and Rx antennas for the lower bands.

The advantages of this invention are many (some may depend on the specific band combination and implementation):

The reduction of number of switches: lower insertion loss, less control lines, smaller current consumption (one PIN diode draws from 4 to 10 mA of current). Switch associated bias components reduction Separate Rx and Tx antennas: for free Tx to Rx isolation, less stringent filtering requirements (especially in CDMA applications), smaller number of components.

LNAs in the Rx module (or on the module, where the Rx filters are): OFF-state LNA provides for free cross band isolation (no need for switches), matching between the filters and LNA can be designed ideally with no unknown factors from various engine board designs (routing etc), only bi-polar needed, system level noise figure in most cases improved and has less variation, in MIMO applications the whole Rx module can be duplicated and due to LNAs in the module even longer connections to RF-ASIC cause only small variations in noise figure and gain (equal noise figure in the different Rx-branches is important in a MIMO receiver).

Modules having common footprint, I/O allocation may be used with only the internal die selected, depending on the build required.

The filtering of GSM Tx with truly selective filters obviate the need for switches, since at least three filters with no over lap in frequency can be matched to one single feed point.

The Rx antenna 20 can be optimized for omni-directionality, whilst the upper band Tx antenna 10 can be optimized to achieve as low SAR (specific absorption rate) as possible for low radiation from the mobile terminal.

It should be noted that the W-CDMA modes have been described as W-CDMA EU, US1 and US2. However, the present invention is also applicable to any other W-CDMA modes currently existing and those to be developed in the future.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A receive front-end module for use in conjunction with a transceive front-end module in a multi-band communication device, the communication device having at least a first antenna and a second antenna electrically separated from the first antenna, wherein the transceive front-end module comprises a plurality of signal paths operatively connected to the first antenna for transmitting signals in at least a first transmit frequency band and a different second transmit frequency band, said receive front-end module comprising:
  a feed point, operatively connected to the second antenna for receiving communication signals in the communication device; and
  a plurality of receive signal paths, operatively connected to the feed point for receiving communication signals in a plurality of frequency bands, wherein said plurality of frequency bands includes at least
  a first receive frequency band, which is partially overlapped with the first transmit frequency band in the transceive front-end module, and
  a second receive frequency band, which is spaced from the first receive frequency band in frequency.

2. The receive front-end module of claim 1, wherein the first transmit frequency band comprises a frequency range substantially from 1850 MHz to 1910 MHz, and the first receive frequency band comprises a frequency range substantially from 1805 MHz to 1880 MHz.

3. The receive front-end module of claim 1, wherein the first transmit frequency band comprises a frequency range substantially from 1920 MHz to 1980 MHz, and the first receive frequency band comprises a frequency range substantially from 1930 MHz to 1990 MHz.

4. The receive front-end module of claim 3, wherein the second receive frequency band comprises a frequency range substantially from 2110 MHz to 2170 MHz.

5. The receive front-end module of claim 3, wherein the second receive frequency band is partially overlapped with the second transmit frequency band.

6. The receive front-end module of claim 5, wherein the second transmit frequency band comprises a frequency range substantially from 1850 MHz to 1910 MHz, and the second receive frequency band comprises a frequency range substantially from 1805 MHz to 1880 MHz.

7. The receive front-end module of claim 6, further comprising:
  at least one isolation circuit, operative connected to at least one of the receive signal paths, for providing cross-band isolation between the transmitted signals and the received signals.

8. The receive front-end module of claim 7, wherein said isolation circuit comprises:
  a plurality of signal amplifiers disposed in the receive signal paths for isolating the communication signals.

9. The receive front-end module of claim 7, wherein said isolation means comprises:
  at least one switching element operatively disposed between the feed point and said at least one of the receive signal paths for carrying out said isolation.

10. The receive front-end module of claim 9, wherein said at least one switching element comprises a pin diode.

11. The receive front-end module of claim 9, wherein said at least one switching element comprises a solid-state switching device.

12. The receive front-end module of claim 6, wherein said plurality of receive frequency bands further includes a third frequency band comprising a frequency range substantially from 2110 MHz to 2170 MHz.

13. The receive front-end module of claim 12, further comprising
  at least one matching circuit, operatively connected to the plurality of receive signal paths, for impedance matching.

14. The receive front-end module of claim 13, wherein the matching circuit comprises at least one capacitive element and one inductive element.

15. The receive front-end module of claim 13, wherein the matching circuit comprises at least one distributed element.

16. The receive front-end module of claim 12, further comprising a plurality of filters disposed in the plurality of signal paths for filtering signals in corresponding frequency ranges.

17. The receive front-end module of claim 16, wherein the filters comprise surface acoustic wave filters.

18. The receive front-end module of claim 16, wherein the filters comprise bulk acoustic wave filters.

19. The receive front-end module of claim 16, wherein at least one of the filters has a single-to-balanced function included therein.

20. The receive front-end module of claim 16, further comprising:
  a balun-having a first end operatively connected to the feed point and a second end operatively connected to the filters.

21. The receive front-end module of claim 16, further comprising:
  a plurality of baluns, each balun disposed between the feed point and one of the filters.

22. The receive front-end module of claim 21, wherein at least one of the baluns comprises an acoustic balun.

23. The receive front-end module of claim 21, wherein each of the baluns is integrated with a corresponding one of the filters.

24. The receive front-end module of claim 21, further comprising
  at least one matching circuit, operatively connected to the feed point, for matching the filters.

25. A method of reducing reception loss in a portable communication device, the communication device having
  a first antenna;
  a second antenna electrically separated from the first antenna;
  a plurality of transmit signal paths for transmitting communication signals in at least a first transmit frequency band and a different second transmit frequency band;
  a plurality of receive signal paths for receiving communication signals in a plurality of frequency bands, including at least
  a first receive frequency band, which is partially overlapped with the first transmit frequency band, and
  a second receive frequency band spaced from the first receive frequency band in frequency, said method comprising the steps of:
  operatively connected the transmit signal paths to a first antenna; and
  operatively connected the receive signal paths to the second antenna so that the communication signals in the first transmit signal band and the communication signals in the first receive signal band are conveyed via different antenna.

26. The method of claim 25, further comprising the step of
  impedance matching the plurality of receive signal paths.

27. The method of claim 25, further comprising the step of
  providing an isolation circuit in at least one of the receive signal paths for cross-band isolation between the transmitted communication signals and received communication signals.

28. The method of claim 25, further comprising the step of
   providing a plurality of signal amplifiers in the plurality of receive signal paths for cross-band isolation between the transmitted communication signals and the receive communication signals.

29. The method of claim 25, further comprising the step of
   providing a plurality of filters in the plurality of receive signal paths for filtering signals in corresponding frequency ranges.

30. The method of claim 29, further comprising the step of
   providing a balun between the second antenna and each of said plurality of filters.

31. A portable communication device, comprising:
   at least a first antenna;
   a second antenna electrically separating from the first antenna;
   a transceive front-end module comprises a plurality of signal paths operatively connected to the first antenna for transmitting signals in at least a first transmit frequency band and a different second transmit frequency band; and
   a receive front-end module comprising:
   a feed point, operatively connected to the second antenna for receiving communication signals in the communication device, and
   a plurality of receive signal paths, operatively connected to the feed point for receiving communication signals in a plurality of frequency bands, wherein said plurality of frequency bands includes at least
   a first receive frequency band, which is partially overlapped with the first transmit frequency band in the transceive front-end module, and
   a second receive frequency band, which is spaced from the first receive frequency band in frequency.

32. The portable communication device of claim 31, comprising a mobile terminal.

* * * * *